United States Patent [19]

Lorie et al.

[11] Patent Number: 5,280,612

[45] Date of Patent: Jan. 18, 1994

[54] MULTIPLE VERSION DATABASE CONCURRENCY CONTROL SYSTEM

[75] Inventors: Raymond A. Lorie; Chandrasekaran Mohan; Mir H. Pirahesh, all of San Jose, Calif.

[73] Assignee: International Business Machines Corporation, Armonk, N.Y.

[21] Appl. No.: 801,769

[22] Filed: Nov. 26, 1991

[51] Int. Cl.⁵ .................... G06F 15/40; G06F 12/00
[52] U.S. Cl. .................................. 395/600; 395/425; 364/DIG. 1; 364/222.81; 364/222.82; 364/282.1; 364/281.1
[58] Field of Search ........................ 395/600, 650, 425

[56] References Cited

U.S. PATENT DOCUMENTS

| | | | |
|---|---|---|---|
| 4,627,019 | 12/1986 | Ng | 364/900 |
| 4,853,843 | 8/1989 | Ecklund | 364/200 |
| 4,875,159 | 10/1989 | Cary et al. | 364/200 |
| 5,043,876 | 8/1991 | Terry | 364/200 |

OTHER PUBLICATIONS

Chan, A. et al, "Implementing Distributed Read-Only Transactions", *IEEE Transactions and Software Engineering*, vol. SE-11, No. 2, Feb. 1985.
Robinson, J. et al, "Elimination of Lock Contention and Relational Databases Accessed by Read-Only Queries and On-Line Update Transactions", IBM Technical Disclosure Bulletin Jun. 1988, pp. 180-185, Jun. 1988.
Todd, S., "Concurrency Systems Suitable for Distributed Databases", IBM Technical Disclosure Bulletin Jun. 1978, pp. 383-386, Jun. 1978.
R. Bayer, H. Heller & A. Reiser, "Parallelism and Recovery in Database", *Transactions on Database Systems*, vol. 5, No. 2, Jun. 1980.
David P. Reed, "Naming and Synchronization in a De-Centralized Computer System", Phd Thesis, Technical Report MIT/LTS/TR-205, Sep. 1978.
Richard E. Sterns, et al., "Distributed Database Concurrency Controls Using Before-Values", *Proceedings of the Association for Computing Machinery SIGMOD International Conference on Management of Data*, Ann Arbor, Michigan, Apr. 1981.
Arvola Chan, et al., "The Implementation of An Integrated Concurrency Control and Recovery Scheme", *Proceedings of the Association for Computing Machinery SIGMOD International Conference on Management of Data*, Orlando, Florida, Jun. 1982.

*Primary Examiner*—Paul V. Kulik
*Attorney, Agent, or Firm*—Baker, Maxham, Jester & Meador

[57] ABSTRACT

An improved concurrency control system for application to a distributed concurrent transaction and query processing system using multi-version database records to overcome delays arising from lock conflicts. Read-only queries are afforded a consistent "stable state" of the database during the life of the query. Updating transactions requiring locks can proceed without waiting for the termination of long queries. At least two database versions are necessary, although availability of more versions permits long read-only queries to phase-out over time without forcing new queries to use aged "stable-state" data and without roll-back. Read-only queries can be terminated and converted to locking transactions to permit an update of the "stable state" database version before the queries would normally terminate. A novel record key structure having a plurality of substructures corresponding to the several database versions is used to access database records. Rapid selection of proper record version and efficient version tracking and updating is effected using several bit-mapped transaction index tables.

19 Claims, 8 Drawing Sheets

```
lock (versionblock,exclusive)
if cur_v - oldest_v =N-2 then
   /*Oldest version period must be phased out; no new transaction
   **of the oldest version must be started;
   */
   unlock versionblock;
   lock (future_v,exclusive);
       /*queue behind other refreshers future_v is the name of the
       **latch used to queue all the pending refreshers.
       */
   lock (versionblock, exclusive);
   tmp=versionblock;
   unlock versionblock;
   /*wait for type Q transactions with version=tmp.cur_v - (N-2) to finish*/
   lock ( (tmp.cur_v - (N-2)), exclusive);
   unlock (tmp.cur_v - (N-2))
   lock (versionblock, exclusive);
   unlock future_v;
endif
NSLU(oldest_v) <-NSLU(oldest_v+1) <-...<-NSLU(cur_v) <-UL;
                         /*from left to right*/
increment cur_v;
/*set the oldest_v to the oldest active version*/
call move_oldest_v; /*see the routine under update record*/
unlock(versionblock)
```

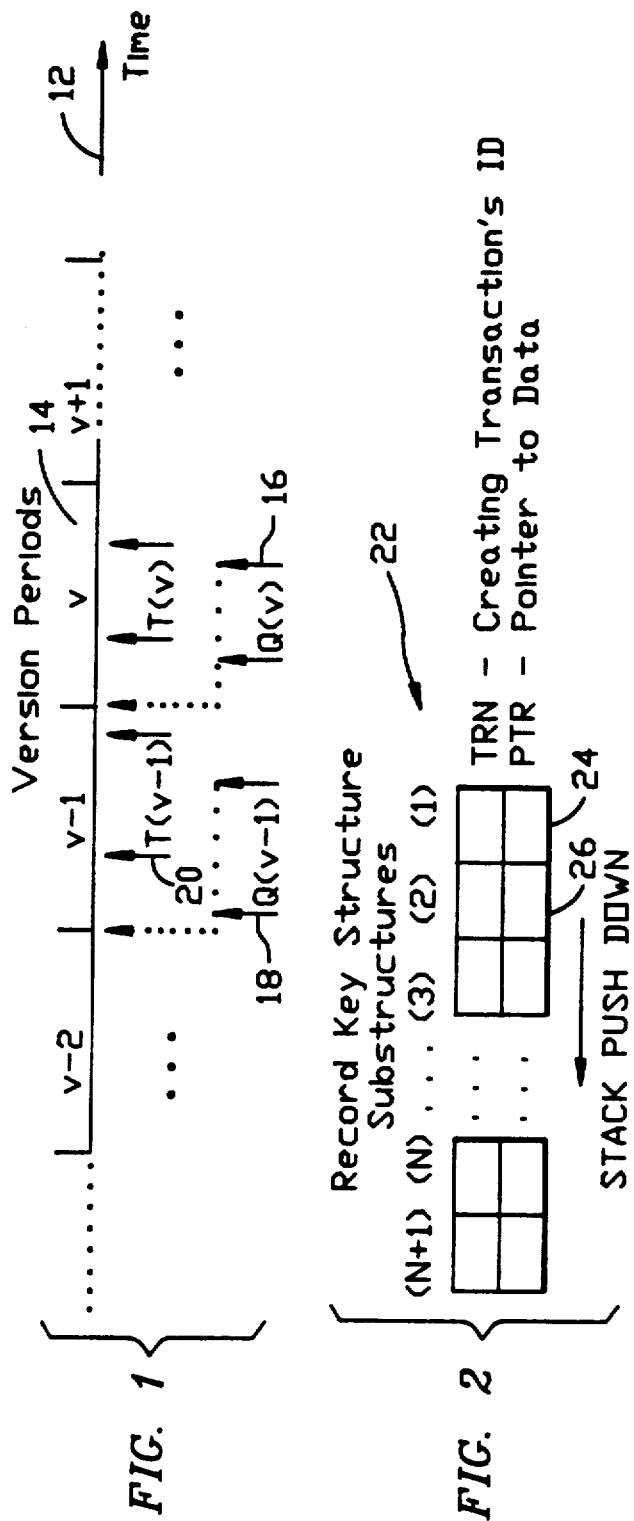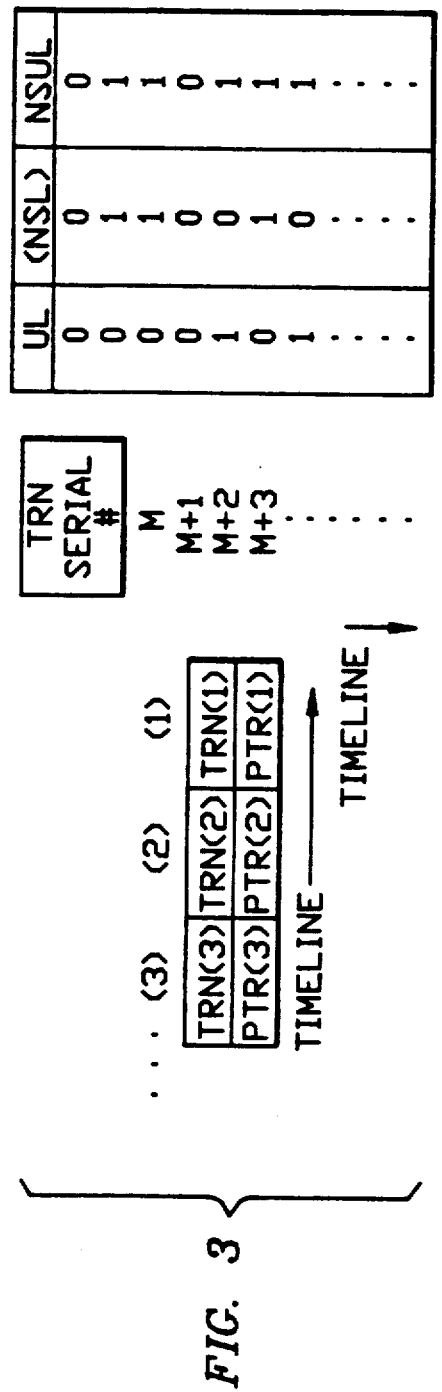
FIG. 1
FIG. 2
FIG. 3

```
versionblock
  cur_v      /*current version number*/
  oldest_v   /*version number of the oldest active query*/
  N          /*max number of versions (N-version algorithm)   */
```

FIG. 4

```
if TRN(top)=my_transid then
    update the record on the top of the stack.
else
    Push_carefuli
    insert the updated record on the top of the stack with TRN=my_transid;
endif Push_careful:
/*This routine does a garbage collection of the stack, and if the stack is
**full, it waits until a slot becomes available. Note that this routine is
**always called for the first update of each transaction.
*/
garbage_collect_stack;
if the stack is full then
/* This only happens if the stack size is <=N.If stack size is N+1 this
** never happens (bigger stack size is never needed).
** For N=3, and stack size = 3, the stack looks like:
** top:     a record with version: v
** middle:  a record with version: v-1
** bottom:  a record with version: <v-1
**bottom of the stack (version v-1) is needed for queries of version
**v-1. We have to wait until those queries terminate.
*/
```

FIG. 5A

```
tmpvbu=version of the element just above the bottom of the stack;
lock (versionblock,exclusive);
tmp_oldest_v=versionblock.oldest_v;
unlock versionblock;
k=tmp_oldest_v;
repeat
  if k>tmpvbu then exit;
  /*wait for completion of k version period*/
  lock (version period k, exclusive);
  lock (versionblock, exclusive);
  if k<oldest_v then
    unlock versionblock;
    unlock version period k;
    k=oldest_v;
  else
    last_v=k+1;
    unlock versionblock;
    unlock version period k;
    k=k+1;
  endif
endrepeat;
garbage_collect_stack;
/*now the stack is guaranteed not to be full*/
endif
push the stack;
```

*FIG. 5B*

```
- garbage_collect_stack:
  lock (versionblock,exclusive);
  call move_oldest_v;
  tmp=versionblock;
  unlock versionblock;
  remove all elements of the stack except
    the latest record of version tmp.cur_v,
    the latest record of version tmp.cur_v-1,
    ...
    the latest record of version tmp.oldest_v, and
    the latest record of version <tmp.oldest_v;
  /*note that this part is done after unlocking the versionblock
    to prevent a hot spot on versionblock, particularly because an I/O
    may be involved to remove overflow records       */
+ move_oldest_v
  /*move oldest_v ahead if possible*/
  for k= oldest_v to cur_v
    /*check if the version k is not needed*/
    if k< cur_v then
      conditional lock (version period k, exclusive);
      if locked then oldest_v=k+1; unlock version period k;
      else exit;
      endif
    else /*k=cur_v*/ oldest_v=cur_v; exit;
    endif
  endfor
```

FIG. 5C

```
lock (future_v, shared);        /*wait if the version period is changing*/
lock (versionblock,shared);
unlock future_v;
birthversion = versionblock.cur_v;   /*remember the birth version*/
lock (birthversion,shared);
unlock versionblock;
```

FIG. 6

```
lock (versionblock,exclusive);
if cur_v - oldest_v =N-2 then
  /*Oldest version period must be phased out; no new transaction
  **of the oldest version must be started;
  */
  unlock versionblock;
  lock (future_v,exclusive);
    /*queue behind other refreshers future_v is the name of the
    **latch used to queue all the pending refreshers.
    */
  lock (versionblock, exclusive);
  tmp=versionblock;
  unlock versionblock;
  /*wait for type Q transactions with version=tmp.cur_v - (N-2) to finish*/
  lock ( (tmp.cur_v - (N-2)), exclusive);
  unlock (tmp.cur_v - (N-2))
  lock (versionblock, exclusive);
  unlock future_v;
endif
NSLU(oldest_v) <-NSLU(oldest_v+1) <-...<-NSLU(cur_v) <-UL;
                                          /*from left to right*/
increment cur_v;
/*set the oldest_v to the oldest active version*/
call move_oldest_v; /*see the routine under update record*/
unlock(versionblock)
```

*FIG. 7*

- Type T precommit at participant node:
  lock (versionblock, exclusive)
  if transaction version < versionblock.cur_v then abort
  else
    if transaction version= cur_v then remove it from UL list.
    else /*transaction version > cur_v*/
      remember its version in its transaction control block
    endif
    set the corresponding bit in PL list (precommit list)
    unlock versionblock
    do any 2PC logic required
      /*e.g. regular, presumed abort, or presumed commit*/
      and remember the version number as part of log records
  endif

*FIG. 8A* do the same as for version switching in the non-distributed
N-version method of Figure 7
for each transaction in UL
  if the transaction version=the new current version then
    /*i.e. this was a future transaction and now it is current*/
    remove from UL
  if transaction is committed then
    wake up its process /*so it will release its locks and return*/
  endif
endfor

*FIG. 11*

- Type T phase two at participant node:

```
do any 2PC logic required;
   but do not release write locks or delete the transaction control block.
Remove the transaction from PL list.
lock versionblock;
If transaction version<=versionblock.cur_v then
   release locks;
   delete the transaction control block.
else
   unlock versionblock;
   remember the transaction write locks and version number in log records;
   go to sleep;
   /*this process will be woken up by the version switching
   **process when the version of this transaction is equal to the
   **current version of the node.
   */
   /*the write locks will be released when the version of this transaction
   **is equal to the current version of the node.
   */
   /*after wake up*/
   release the write locks; delete the transaction control block;
endif
```

*FIG. 8B*

```
Query start:
* At originator node: assign the birth version

* At participant node: (this is done at the first visit
  of a type transaction to a participant node)
  lock (versionblock, exclusive);
  if birthversion <oldest_v or birthversion>cur_v then
      abort; /*out of range version*/
  else
      /*check to see if the oldest version period is being phased out*/
      conditional lock (birthversion,shared);
      if lock not granted then abort;
  endif
  unlock versionblock;
```

*FIG. 9*

```
Query read:
Find the first element in the stack with version<birthversion;
If transaction of this version is in PL then abort.
/*An alternative is to wait until the precommitted transaction
**commits (or aborts), but this may take a long time,
***and we prefer for the read transactions not to wait.
*/
else read the element;
endif
```

*FIG. 10*

MULTIPLE VERSION DATABASE CONCURRENCY CONTROL SYSTEM

BACKGROUND OF THE INVENTION

Field of the Invention

This invention relates to methods for concurrent database access by multiple transactions and queries in general, and more specifically, to techniques for eliminating transaction waiting during read-only queries by maintaining multiple versions of records.

Description of the Related Art

The simultaneous or concurrent execution of transactions that update a few data more or less randomly and transactions that access large numbers of data is a well-known problem in the database systems art. A transaction may read from the database, write to the database, or both. Because accessing transactions must lock records to ensure consistency, locking conflicts can arise between concurrent transactions. Upon such a conflict, one of the transactions must wait. The locking conflict is logical and the database management system solution is limited to serializing the transactions. However, other solutions to the wait-on-conflict problem are possible if the extensive transaction is limited to a read-only transaction or query.

When several transactions execute concurrently in the same database, the consistency of data may no longer be preserved. Thus, the system must control the interaction among the concurrent transactions. This control is achieved through a concurrency control procedure that exploits and guarantees transactional consistency. Because a transaction is a unit that preserves consistency, any schedule produced by a concurrency control scheme for processing a set of transactions concurrently must be computationally equivalent to a schedule produced by executing the same transactions serially in some order. This property is usually guaranteed by maintaining serializability in a manner known in the art.

To ensure serializability, any of a variety of different concurrency control methods may be used. In general, the concurrency control methods known in the art ensure serializability by either delaying an operation or aborting the transaction that issued the operation. The classes of methods well-known in the art include "locking protocols", "timestamp ordering" schemes, "validation" techniques, and "multi-version" schemes. For a survey of the related art, reference is made, for example, to H. F. Korth, et al, "Database System Concepts", Chapter 11, *Concurrency Control*, McGraw-Hill, New York, 1986.

Selection of a concurrency control scheme should reflect consideration of the desired balance of several conflicting criteria. The selected method must guard against cascading rollbacks during recovery without reducing system parallelism more than absolutely necessary. For instance, a typical multi-version concurrency control scheme assumes that each "write" operation creates a new version of the updated record. When a "read" operation is issued to the updated record, the system selects one of the record versions to be read. The concurrency control scheme must ensure that the version selection is made in a manner that guarantees serializability. This can be accomplished through the use of timestamps, for instance. In such a system, a read operation always succeeds while a write operation may result in transaction rollbacks.

The application of such multi-version techniques is useful for reducing the locking required to ensure serializability of concurrent transactions. Any locking reduction will beneficially reduce transaction wait states and thereby increase system parallelism. Thus, the art is replete with techniques for locking reduction, including other multi-version approaches.

R. Bayer, et al disclose a complex multi-version support mechanism (Bayer, R., Heller, H., and Reiser, A., "Parallelism and Recovery in Database Systems", *Transactions on Database Systems*, Vol. 5, No. 2, Jun. 1980). Bayer, et al require a continuous and costly maintenance of a graph that tracks the inter-transaction dependencies to avoid both non-serializable transaction executions and deadlocks. Bayer, et al require even read-only transactions or queries to lock the data objects being read, although the read-locks are granted without wait states. Query transactions also incur the cost of analyzing the dependency graph to locate the object version that must be read. Sometimes non-query updating transactions may be rolled back to preserve data atomicity. Read-only queries are never rolled back.

Because only two versions of any data item are maintained by Bayer, et al, the commit of an updating transaction may be delayed by a read-only query that is actively reading the earlier record version targeted for update. The Bayer, et al approach also incurs additional lock-related overhead for updating transactions compared to the overhead required in non-multi-version concurrency control schemes. They do not consider space management, structures required to track locations of different object versions, partial rollbacks, and incremental versioning, which are all problematic issues known for multi-versioning concurrency control schemes.

D. Reed proposes the use of timestamps for synchronization (Reed, D., "Naming and Synchronization in a Decentralized Computer System", PhD Thesis, Technical Report MIT/LTS/TR-205, MIT, Sept. 1978). Reed's method requires all read-only queries to update the timestamp control information associated with the data objects being read. His method permits creation of an unlimited number of object versions, thereby raising potential space management problems. Reed does not consider the garbage collection problem. Reading of records may be delayed and updating transactions may be aborted to avoid serializability violations.

Stearns, et al propose a similar method that may block or abort read-only queries under some circumstances and may delay the committing of updating transactions until termination of read-only queries accessing previous object versions (Stearns, R. E., Rosenkrantz, D. J., "Distributed Database Concurrency Controls Using Before-Values, *Proc. SIGMOD International Conference on Management of Data*, Ann Arbor, Apr. 1981).

A. Chan, et al propose a method that permits creation of any number of object versions, thereby raising potential space management problems (Chan, A., Fox, S., Lin, W-T., Nori, A., and Ries, D., "The Implementation of an Integrated Concurrency Control and Recovery Scheme", *Proc. SIGMOD International Conference on Management of Data*, Orlando, Jun. 1982.). Chan, et al provide versioning at the page level, thus requiring the transfer of an entire page to a slot in their "version pool" even if only a small part of the page is changed.

Besides the path length overhead, this approach unnecessarily consumes buffer and disk space. Moreover, if a read-only query accesses a logical page having an uncommitted version, then the query must search at least one additional page before locating the committed page version needed, thereby increasing I/0 overhead. This occurs because their different page versions are back-chained and each version is labelled with the identifier code of the creating transaction. A read-only query is required to read the most recent version of the page created by an updating transaction that is committed at the time the read-only query has begun. Because of this, every new read-only query must be associated with a Committed Transaction List ("CTL").

This Chan, et al page level versioning method uses a "version pool", guaranteeing that clustered access to physically contiguous pages for read-only queries, especially long ones, is not possible. Their garbage collection method may waste space in "version pool" and every updating transaction must track the slots used in the "version pool". Chan, et al clearly support only page level locking in their versioning scheme. Page level locking, especially for index data, normally leads to an intolerably low level of concurrency. Chan, et al do not actually discuss how their versioning is done for index data. Their method requires all modifications made by an updating transaction to be forced to disk at commit time. Because versioning is being done at the page level and because the before images of modified records are not logged, the previous version of the modified page must also be forced to disk before the modified version of the page with uncommitted changes is put on disk. These are a costly operations.

Chan and Gray later extend the Chan, et al scheme to the case of distributed read-only queries (Chan, A., and Gray, R., "Implementing Distributed Read-Only Transactions", *IEEE Transactions on Software Engineering*, Vol. SE-11, No. 2, 1985). The Chan and Gray algorithm causes the CTL of a given site to be transmitted in all precommit and commit messages sent by that site. Thus, read votes cannot be used to avoid the second phase of commit processing as is possible in other distributed database management systems known in the art (e.g., R* DDBMS). Sites that receive CTLs from other sites merge them with their own CTLs to create new versions of their own CTLs. To avoid aborting a read-only query because of premature garbage collection of the data needed by the query at the remote site, the set of retrieval sites that the ready-only query will visit must be known in advance and each of those sites must first be queried for its CTL before the query transaction starts. The union of the received CTLs must then be transmitted to all retrieval sites for use by the query to determine the data object versions to be read. Once the retrieval sites communicate their CTLs, they must be somehow prevented from garbage-collecting the data snapshot defined by the CTLs. This Chan and Gray algorithm incurs additional overhead to maintain CTLs in stable storage. These CTLs could become quite large. Chan and Gray do not suggest how premature garbage collection can be prevented or even detected.

Reference is also made to the disclosure by J. Robinson, et al of a technique for concurrency control using on-demand versioning to eliminate lock contention when an updating transaction must lock a record in a page required by a read-only query (Robinson, J., Thomasian, A., and Yu, P.S., "Elimination of Lock Contention in Relational Databases Accessed by Read-Only Queries and On-Line Update Transaction", I.B.M. Technical Bulletin 06-88, p. 180-85, Jun. 1988). Robinson, et al disclose a method wherein a page version containing the record accessed by a read-only query is prepared for the query and the global copy of the page is made available to the updating transaction. Versioning granularity can be varied and the version pages may be stored in a shared buffer pool along with other data. Different versions of the same page may co-exist in the buffer for queries started at different times. Robinson, et al do not consider the problems of efficiently controlling the various versions or of the efficient garbage collection of version data following read-only query termination.

S. Todd discloses a concurrency system that provides a deadlock-free environment for use in a distributed database system that tracks multiple versions of data pages (Todd S., "Concurrency System Suitable for Distributed Databases", I.B.M. Technical Disclosure Bulletin, 06-78, p. 383-386, Jun. 1978). Todd describes a method for labeling various page versions to indicate version status as replacement, lock or current. His method replaces the use of read locks with version control and permits all read-only queries to access the database without wait states.

In U.S. Pat. No. 4,627,019, Fred K. Ng discloses a versioning technique that stores an array of access blocks, each block defining the database location of a version of a relation, only one of which is defined as current. However, his technique requires a new access block in the access dictionary (defining a new database location) for every update transaction. Database access by each of a plurality of database transactions is permitted only through the relation block associated with that particular transaction. Ng's technique appears to be intended for use in systems with few updating transactions and many read-only queries.

In U.S. Pat. No. 4,853,843, Denise J. Ecklund discloses a system for merging virtual partitions of a distributed database where various database versions exist among the partitions. In U.S. Pat. No. 4,875,159, Richard W. Cary, et al disclose a version management system for synchronizing two versions in a multi-processor system. Both the Ecklund and Cary, et al techniques are intended for coordinating versioning control among independent processors in a distributed data processing system.

There is a clearly-felt need in the art to improve the optimization of tradeoffs between transaction concurrency and the delays arising from lock conflicts in concurrent processing systems. The related unresolved problems and deficiencies are clearly felt in the art and are solved by the present invention in the manner described below.

SUMMARY OF THE INVENTION

The present invention is a method for maintaining at least one "stable-state" version of the database for use by read-only transactions or queries concurrently with updating transactions. A query need only access a consistent state of the database and often does not require that consistent state to reflect the current database state at the time the query terminates. Thus, maintaining a "stable-state" version of the database for use by queries permits extensive read-only queries to access consistent data without the associated read locks forcing concurrent updating transactions to wait for query completion and without forcing a query to wait for commit of updating transactions. When no query is active, the "stable-state" version can be updated to reflect a later committed database state. Occasionally, when a read-only query must access the most recent database version, it may be relabeled and restarted as an updating transaction and thereby acquire the necessary read locks on all data.

The concept of a flexible "version period" for a database processing system is introduced. Because transactions move the state of the database along the time axis, the time axis may be divided into a series of "version periods", which are numbered sequentially. An updating transaction is assigned the version number of the version period during which the transaction commits. A read-only query is assigned the version number of the version period during which it arrives. An updating transaction is permitted to acquire read and write locks on the most current version of each record accessed. A read-only query is directed to read records from a present "stable-state" version of the database. The "stable-state" version accessed by a read-only query remains unchanged during the life of the query.

A new version of a record is created whenever any updating transaction writes new data to a record that was created by a previous committed transaction. An arbitrarily long chain of increasingly outdated "stable-state" versions can be created and maintained. Each "stable-state" version need be retained only as long as necessary to terminate all active queries that are using that particular version.

The method of the present invention is implemented by using a novel "version-block" record key structure to provide a direct access path to the associated record data. Version control and tracking is implemented by maintaining several transaction identification lists. First, in main memory, the system maintains a List of Uncommitted update transactions, (UL), and a List of committed but Not yet Stable state update transactions, (NSL). Actually, the union of UL and NSL, which is NSUL, is maintained as the list of interest instead of NSL. A separate NSUL is kept for each aging stable-state database version Because the record key structure provides a direct path to each record version and also identifies the creating transaction for each record version, the record version can be defined as the version of the creating transaction (that is, the version period during which the creating transaction committed). Accordingly, the record key structure of this invention enables the system to quickly redetermine the currency of a record version by comparing the associated creating transaction with the two transaction lists UL and NSUL. This efficient redetermination method allows the system to dynamically track all database versions as they flow back along the timeline.

The present stable-state version can be refreshed by switching the present version period to a new later value. This is done, in part, by resetting the oldest NSUL to UL to flush out all non-stable committed transactions. The switching can occur as soon as all read-only queries using the oldest stable-state database version are terminated. This refreshing method brings each recently committed version of the database into atomic visibility for subsequent read-only queries.

The method of the present invention is applicable to distributed processing systems and is dynamic in that it can include from two to an indefinitely large number of database versions. The application of this method to a non-distributed database processing system is a special case of the distributed system application and there is no significant increase in overhead incurred by using the more generalized distributed concurrency control embodiment for the local non-distributed application. Also, there is little additional overhead cost in using the N-version embodiment to maintain merely two versions, which is the simplest case of interest. These two versions are the "present" version and the "present stable" version.

Thus, it is an object of this invention to provide a consistent "stable-state" of the database for use by read-only transactions, herein called queries, without requiring read locks, thereby avoiding lock-conflicts with concurrently processed updating transactions having both read and write locks on the database. It is another object of this invention to support efficient distributed database access and to permit record-level locking.

It is an advantage of the present invention that recovery can be performed by using shadow pages and logs, or by using write-ahead logging. It is a feature of the present invention that all read-only queries not requiring the latest state of the data will not acquire any long duration locks, thereby avoiding all waits caused by lock-conflicts with concurrent updating transactions. It is another feature of this invention that read-only queries do not update any control information (e.g. timestamps) associated with the data records queried. There is no need to assign timestamps to queries or transactions because the serialization order among conflicting transactions is determined dynamically by the method of the present invention.

It is both an object and an advantage of this invention that no forced roll-back of transactions is necessary to accommodate system support of multiple database versions and such roll-backs are used only in event of deadlocks between such transactions. It is a feature of this invention that the maximum number of versions retained by the system is dynamically adjustable. Another feature of this invention is that in-place updating of data on disk is possible even before transaction termination and there is no need for deferred update. There is also no need to force to disk all modified pages at commit time.

An advantage of this invention is that incremental versioning can be performed to reduce storage requirement increases arising from database version maintenance. Also, recovery log volume is reduced because the "before" image of updated fields (or of the complete record during a deletion) need not be logged, except when the same record is being updated more than once by a single transaction.

It is yet another object of this invention to minimize the storage volume required to maintain multiple versions. It is an advantage of this invention that the concept of version periods reduces the volume of storage required because, unlike with other multi-version schemes, a new database version need not be created at each record update.

Another advantage of this invention is that no beginning transaction or query is required to declare the set of data items that it will read or write. It is yet another object and advantage of this invention that read-only queries need never be forcibly rolled back by the system, except in a distributed database processing system as an alternative to unwanted delays in version switching. Because versions may be switched only upon termination of the oldest active read-only queries, it is an advantage of this invention that any read-only query may be forcibly terminated and restarted as an updating transaction having read and write locking capability, thereby permitting version switching on demand without rollback or wait states.

It is another advantage of this invention that asynchronous garbage collection can be performed in the background. Garbage collection is efficiently controlled by means of bit-mapped transaction tables and a "version block" record key structure.

The foregoing, together with other features and advantages of the present invention, will become more apparent when referring to the following specifications, claims and the accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 1 illustrates the concept of version periods on a time line;

FIG. 2 shows a schematic illustration of the version block record key structure of this invention;

FIG. 3 illustrates a bit-mapped embodiment of the UL and NSUL transaction tables;

FIG. 4 provides a PASCAL-type pseudocode embodiment of the version block data structure;

FIGS. 5A-5C provide a PASCAL-type pseudocode embodiment of the record update method of this invention;

FIG. 6 provides PASCAL-type pseudocode embodiment of the method of this invention for locking a version period in shared mode;

FIG. 7 provides a PASCAL-type pseudocode embodiment of the version switching method of this invention for a non-distributed N-version system;

FIGS. 8A-8B provide a PASCAL-type pseudocode embodiment of the two-phase commit protocol for updating transactions in the general distributed N-version embodiment of the method of this invention;

FIG. 9 provides a PASCAL-type pseudocode embodiment of the method of this invention for starting a read-only query in a distributed N-version system;

FIG. 10 provides a PASCAL-type pseudocode embodiment of the method of this invention for execution of a read-only query in a distributed N-version system; and FIG. 11 provides a PASCAL-type pseudocode embodiment of the version switching method of this invention for a distributed N-version system.

DESCRIPTION OF THE PREFERRED EMBODIMENTS

FIG. 1 illustrates the database versions and transaction types concepts as used herein. The ongoing series of transactions moves the state of the database along the time axis 12. Time axis 12 is divided into version periods numbered (v−2), (v−1), (v), and so forth, as exemplified by present version period 14. For the purposes of this disclosure, a read-and-write transaction is denoted by a T and denominated an updating transaction. A read-only transaction is denoted by a Q and denominated a query. A type T transaction is of version (v) if and only if T commits during version period (v). A type Q query is of version (v) if and only if it arrives during version period (v). A query of version (v) sees all of the results of transactions of version less than (v). That is, as shown in FIG. 1, all type Q queries of version (v) will see that database state committed at the beginning of version period (v). Thus, a query 16 is directed to the database as it existed at the beginning of present version period 14 and query 16 is said to have present version (v). Another query 18 is said to have version (v−1) because it refers to the database as it existed at the beginning of version period (v−1).

Periodically, the database system switches to a new version period, allowing the queries to see more recent changes to the database A transaction 20 is said to have version (v−1) because it committed during the version period (v−1). Conversely, any transaction that arrives during present version period 14 and remains uncommitted until after the end of present version period 14 must have a version number greater than (v).

The method of this invention is sufficiently general for application to distributed database systems and can maintain an indefinitely large (N) number of versions of such a database. However, for purposes of clear and simple exposition of this invention, the operation of a two version embodiment is first presented. This two version embodiment allows only two kinds of transactions to be active at the same time. These are types T and Q transactions of the current version (v). In this embodiment, the system can switch to a new version period only when no query is active. The more general N version embodiment of the method of this invention removes this restriction and allows the version period to be switched immediately while the older version periods are gradually phased out. Thus, the N version embodiment permits queries of the last (N−1) version periods to remain active concurrently with type T transactions. The concepts necessary to an understanding of the N version embodiment will be appreciated by referring to the following discussion of the two version embodiment.

A first element of this invention requires the system to maintain a record key structure for each record in the database (see FIG. 2). The database is assumed to be a series of records, each of which is identified by such a key, which can be a logical key or any other suitable type of record identifier. It is also assumed that type Q queries, which are read-only and which do not acquire locks, are identified as such when started and that all type T transactions use read and write locks to synchronize among themselves. With these assumptions, the two version embodiment was found to require no more than three simultaneous record versions These three versions are shown in FIG. 2 as a first version, PTR(1), representing the uncommitted state of the record, a second version, PTR(2), representing the last committed record value that is not in the stable state, and a third version, PTR(3), representing the stable state for type Q queries. These three versions, shown schematically in FIG. 2, are organized as the first three positions in a record key structure 22. Record key structure 22 is shown having (N+1) substructures exemplified by the first substructure 24, which is a column of two fields. These two fields include a record data pointer, PTR, which points to the location in storage containing the record data for this record version and a transaction identifier TRN, which indicates the sequential identifier for the transaction that created this record version.

It will be appreciated by examining FIG. 2 that record key structure 22 can be dynamically varied in size to accommodate the necessary number of substructures for the application. It is later shown that the contents of the substructures, beginning with substructure 24, will normally be pushed down the stack in the indicated direction as new versions are created.

Assuming that the database system supports a direct access path from the record key structure to the associated data, every primary key value is then unique For database systems that do not include the concept of a primary key, the records are often stored in separate areas of memory and each record then identified by a record identifier (RID). In indexes of such systems, the data associated with a key is the RID of the record containing the key value. If an index is not a unique index in such a system, multiple RIDs may be associated with a single particular key value. For the following discussion, the RID in such a system can be thought of as the primary key because it is also unique. The method of the present invention is also applicable to systems using secondary indexes as is later discussed.

The method of this invention requires that every transaction be associated with a unique sequential identifier that increases in value monotonically with time. This is the identifier that is written to the TRN field shown in FIG. 2.

A PTR value of zero would indicate either that the previous version of the record has been deleted by the associated TRN (if that TRN is greater than zero) or that the record version has never existed (if the associated TRN is equal to zero) If there is only one version of the record, then first substructure 24 has the only non-zero contents in key structure 22. When a newer version is added to the system, then the contents of first substructure 24 are pushed down into second substructure 26, the new record version data is inserted into substructure 24, and so forth. Initially, it is assumed that there is a single version of each record with an associated TRN equal to zero.

A second element of the method of this invention requires the system to maintain a list of uncommitted type T transactions in main memory. This Uncommitted List (UL) is illustrated in FIG. 3 together with two other transaction lists required. These include a List of committed but Not yet in Stable state transactions, NSL and the union of UL and NSL which is denoted NSUL. Referring to FIG. 1, NSL is a list of transactions that committed during present version period (v) and UL is a list of all uncommitted transactions, which will eventually have a version number greater than or equal to (v) because they may commit during version period (v) or later. Initially, both UL and NSL are empty.

A record version number is defined to be the version number of the creating transaction associated with that record, which is identified by the TRN in the corresponding substructure. The UL and NSUL transaction lists are maintained in main memory to permit efficient determination of the version status associated with each record key substructure by checking the TRN field against UL and NSUL.

FIG. 3 shows the nomenclature for the first three fields of record key structure 22 Also, FIG. 3 illustrates a useful embodiment of the UL, NSL and NSUL required for the two version embodiment. NSL is included for clarity and is not actually saved. As each new transaction is initiated, a TRN serial number is assigned in sequence, as exemplified in FIG. 3 for TRN numbers M and following. The UL and NSUL are organized as bit map vectors indexed according to the TRN serial number such that a bit in each list is set to one to include the corresponding TRN serial number on the list. Otherwise, the bit is set to zero. Accordingly, referring to FIG. 3, note that TRN(M) is listed in NSUL but not on UL. TRN(M+2) is an uncommitted transaction listed in UL. Because NSUL is a union of the other two lists, any bit set on either UL or NSL will show up as a bit set on NSUL. Accordingly, it is not necessary to maintain NSL in memory.

NSUL in FIG. 3 represents a list of all transactions whose updates are not yet visible to queries. Of course, for the N version embodiment of this invention, there will be a NSUL bit vector for each of a plurality of successively older stable database versions, each such NSUL vector containing all transactions whose updates are not visible to queries of the same or earlier version as the NSUL vector. This can be appreciated by analogy to the two version illustration in FIG. 3.

Elements of the Two Version Embodiment

The following is a description of the two version embodiment rules for actions taken at various stages of the execution of a transaction and a query. These rules and actions are then summarized and illustrated by presentation of a procedural example in Table 1, which is organized to show changes in UL and NSL contents and record key structure as various queries and transactions are started and stopped Start Transaction: When a new transaction is received, a sequential transaction identifier number, TRN, is assigned and that number is inserted into the UL. For the bit-mapped UL illustrated in FIG. 3, this means that the bit corresponding to the TRN is set to one.

Read a Record for a Transaction: The transaction submits a read request identifying the record and the system submits the corresponding record key structure. The record key structure first returns the record version PTR(1) on top of the stack in the first substructure. Record version PTR(1) was created either by the current transaction or by a committed transaction. The transaction locking scheme guarantees that PTR(1) was not created by some other uncommitted transaction.

Update a Record: The associated record key structure is located by the system as in the read operation. The TRN(1) entry in the first substructure is first examined. If TRN(1) is the same as the present transaction identifier then the update can be made by replacing the most recent version of the record, which is located at PTR(1).

Otherwise, if TRN(1) is not in UL, the PTR(1) record version must have been created through the insert of a new record or the update of a previously existing record by a previous committed transaction. In this case, the present transaction must create a new record version. Before the transaction inserts its new version into the first substructure and pushes the other entries down the stack, the other existing record versions are examined to determine whether any should be discarded instead of merely pushed down.

Note that the locking scheme ensures that the current TRN(1) transaction cannot be listed in UL unless it is the same as the present transaction. If TRN(1) is not listed in NSUL, then its version is the present stable version and it was created by a transaction during an earlier version period. If so, all other preceding record versions are in the stack discarded. If TRN(1) is listed in NSUL, then that record version is saved because it is the most recently committed value and will be needed for the stable state database version when the system is switched to the next version period (v+1).

The second key substructure is next examined. If TRN(1) is listed in NSUL, then the PTR(2) record version is discarded because it is an old committed value that is not used and will not be used in representing the stable state of the database. If TRN(2) is discarded, then the PTR(3) record version is retained because it is and was the stable version. If TRN(2) is not listed in NSUL, then it is the stable version and is saved by pushing it into the third substructure, discarding any previous PTR(3) record version.

Commit Transaction: First, the commit record is forced to the log. Secondly, the TRN is removed from UL and inserted into NSL (if NSL is maintained), leaving it in NSUL. Finally, all read and write locks are released. The first two steps may be skipped for a transaction that did not modify the database in any way.

Abort Transaction: First, an abort record is written to the log. Next, the associated record key stacks are all popped to remove the record versions created by the aborting transaction. Finally, the aborting transaction number is removed from UL and all locks are released.

Read a Record for a Query: The necessary record key structure is first located as with a read for a transaction. The most recent record version is then located by examining the first substructure. If TRN(1) is in NSUL, PTR(1) is unstable and the next most recent version listed in the second substructure is examine. This continues until a stable state version is found. The present stable version is found with the first TRN that is not listed in NSUL. Note that the stable record version may be one in which the record is non-existent, having been deleted or not yet created. If both TRN(1) and TRN(2) are listed in NSUL, then the stable version will always be PTR(3) and may be retrieved without bothering to check TRN(3).

Refresh Stable Version: This is done by switching to a new version period. After all active queries have terminated, either by completion or by early termination and conversion to transactions, the NSL is reset to empty. This forces NSUL to equal UL. It is this action that atomically makes the most recently committed version of the database "visible" to queries.

Following this refresh, the substructures in the record keys may be examined for garbage collection. If PTR(2) or PTR(3) is non-zero, PTR(1) is zero and TRN(1) is not in NSUL, then the existing record versions in the second and third substructures can be garbage collected and freed by setting all PTR entries to zero.

Note that the value of TRN(3) is never examined and hence there is no need to actually store that field. This permits a reduction in the amount of storage necessary for the two version embodiment. For simplicity of presentation, TRN(3) is retained in the example shown in Table 1.

The example in Table 1 may be better appreciated by referring to the following summary of the rules for the two version embodiment, which are used to establish the UL, NSL and key structure contents at each step illustrated in the example. Read for T: Fetch PTR(1).
Write for T: Test TRN(1);
 If TRN(1) in UL, write PTR(1) record.
 If TRN(1) not in UL, test TRN(1);
  If TRN(1) in NSLU, test TRN(2);
   If TRN(2) in NSUL, discard PTR(2) record.
   If TRN(2) not in NSUL, discard PTR(3) record, push-down stack, and set PTR(1) to updated record.
  If TRN(1) not in NSUL, discard PTR(2) and PTR(3) records, push-down stack, and set PTR(1) to new record.
Read for Q:
 Test TRN(1);
 If TRN(1) in NSUL, test TRN(2);
  If TRN(2) in NSUL, fetch PTR(3) record.
  If TRN(2) not in NSUL, fetch PTR(2) record.
 If TRN(1) not in NSUL, test PTR(1);
  If PTR(1)=0, ignore nonexistant record.
  If PTR(1)≠0, fetch PTR(1) record.

Note that it is enough for the method of the present invention if only the changed fields are recorded. This feature is denominated "incremental versioning". Removing an old version might therefore mean combining two versions together to obtain a fully updated record. With incremental versioning, accessing of multiple versions may be required to obtain the complete record of a given version during a read operation.

The method presented above and illustrated in Table 1 is readily applicable to secondary index information. A secondary index is considered as a unary relation where the only column contains the concatenated key, which is written as (secondary key, primary key), and there is no other data. Hence, incremental versioning makes no sense for secondary indexes. Only the insert and delete operations require support. Additionally, the differences between record versions in a record key structure is limited to information about whether the key exists or not. Therefore, the substructure becomes as shown in Table 2, where the TRN field is defined as above and the flag field is limited to information about the key's existence. If the key exists, the flag is one and, if not, the flag is zero.

In the secondary key substructure shown in Table 2, the numeral 9 is the secondary key and the group of numerals 1234 is the primary key or record identifier. Because there are no other data associated with a secondary index entry, the flag shows only whether in a particular version the index entry should be considered to exist or not. As before, TRN(3) is not required because it will not be examined.

The remainder of Table 2 shows part of the procedural example from Table 1 assuming that there is a secondary index. When the secondary index changes, the flags in the earlier versions substructures are zeroed, indicating that the earlier versions with the new secondary index do not exist. Otherwise, all transaction and query operations proceed as discussed above in connection with Table 1.

The implementation of UL and NSUL illustrated in FIG. 3 is a compact and efficient method for supporting an existence test. The length of the bit vectors must be large enough to ensure that all transactions preceding the earliest entry can not be in UL or NSL. A latch is associated with each of the two lists. Readers of the list vectors hold the latch in share mode and updates hold it in exclusive mode during the respective operations.

The method of this invention has a positive effect on the requisite log and lock schemes. For instance, queries need not set locks and do not write log records. If no intermediate savepoints are supported, old record values ("before images") need not be logged by transactions when modifying the database. It is enough to log the key or record identifier of a modified record and the new values ("after images") of the modified fields. Even if intermediate savepoints are supported for partial rollbacks, it is necessary to log the "before" image of an updated record only when a single transaction is updating the same record for a second or subsequent time. This should be a rare event and is simple to detect when occurring. "After" images are logged to support media recovery and to avoid a requirement to force modified data to disk at commit time.

Transactions are never blocked by queries. Also, this method is amenable to on-line, asynchronous garbage collection. When transaction activity is low, if a page is modified, then all records on the page can be scanned for supercilious versions, taking into account the UL and NSUL tables as for an update operation. When the transaction activity is very low, a garbage collection transaction can clean up a few pages at a time. This would bring down the average number of record versions in the database and would be particularly appropriate for a dedicated back-end database machine. Note again that an index is like any other relation and can be garbage-collected independently of the corresponding data file.

Physical clustering of data is preserved as long as each page has enough free space to accommodate the updated record. Additional page access is performed by transactions only if the original page lacks sufficient space for the new record version. When such an overflow occurs and incremental versioning is in progress, garbage collection of the overflow record cannot be accomplished independently. It must be done by accessing the primary page having the pointer addressing the overflowed record.

In this two version embodiment, no query should be active when the version period is switched. Either all queries must be aborted or all incoming queries must be converted to transactions until the active queries are completed before version switching. After switching, queries can again be permitted to start. If some queries are very long, then it is desirable to allow phasing out of these queries when the version period is switched. This requires a system that permits queries to remain active longer than the present stable state is in existence. In general, many versions of queries should be allowed so that the version period can be switched whenever desired. The N version embodiment of the method of this invention described below permits this.

Elements of the N Version Embodiment

This embodiment permits transactions to be concurrently active in the system with queries of the current version, the current version minus one, minus two, ..., minus $(N-1)$. Hence, the phasing-out period following version switching can be nested $(N-2)$ times. The two version embodiment discussed above does not permit a phasing-out period for queries although a three version embodiment would permit one level of phasing-out period nesting and so forth. The record key structure stack size can vary between three and $(N+1)$ as illustrated in FIG. 2. However, a record key stack size of less than $(N+1)$ will not completely support all N versions and may cause some transactions to wait for room in the record key stack. For a given value of N, the probability of transaction wait states is inversely proportional to the record key stack size.

This N version embodiment uses a version-block data structure defined in FIG. 4. Initially, cur_v and oldest_v are set to one. The identifier of the first transaction must be greater than the TRN associated with any record in the database. That is, if all database records have TRN equal to zero, then the identifier of the first transaction can be one. The NSUL contains the committed transactions of current version (v) and the uncommitted transactions, as before. Because a different NSUL bit vector is required for each of a plurality of stable versions, the NSUL for the current version (v) is denoted NSUL(v). The new vector denoted NSUL(v−1) contains the committed transactions of versions (v−1) and (v) as well as uncommitted transactions. Thus, a query having version (v) need test only NSUL(v) and a query of version (v−1) need only test NSUL(v−1). Generally, a two-dimensional bit map comprising NSUL(v), NSUL(v−1), ..., NSUL(v−N+1) is required to support N database versions The rules governing the actions required at various stages of execution of transactions and queries are discussed below in similar fashion to the above discussion of the two version embodiment.

Start Transaction: A TRN is assigned to the new transaction and the associated bits are set in the UL and NSULs.

Read a Record For a Transaction: This procedure is identical to that discussed above for the two version embodiment.

Update Record: FIG. 5, comprising FIGS. 5A, 5B and 5C; lists a pseudocode embodiment of the logic for updating a record in the N version embodiment of this invention The delete and insert logic is similar and is not repeated here as it is obvious to practitioners in the art in view of FIG. 5. The first update of a record within a transaction requires a new record version to be pushed into the record key stack. The record key stack is first garbage-collected and then, if there is room, the updated record PTR(1) is pushed. Otherwise, the stack is full, which happens only if the stack size is less than $(N+1)$, and the transaction must wait until the element at the bottom of the stack is no longer needed by active queries. The bottom element can be garbage-collected when all queries having versions up to and including the version of the element next to the bottom of the stack are terminated.

Transactions operate to rid the record key structure of garbage and help keep the database compact. This is accomplished in two ways. The oldest_v pointer is moved to the oldest version period with active queries so that unneeded elements can be deleted from the stack. Also, if the stack contains more than one element belonging to the same version period, all but the latest are deleted.

Commit Transaction: This procedure is the same as discussed above for the two version embodiment Note that only UL must be changed The sequence is: Force write the commit record to the log, remove the transaction number from UL and release all locks.

Abort Transaction: This procedure is the same as disclosed above for the two version embodiment.

Start a Query: When the query arrives, the current version period is assigned as "birth version" of the query. The birth version is used to select the appropriate record version for reading. Also, the version period associated with the birth version is locked in shared mode. This permits the version period to be later phased out by locking it in exclusive mode, which will be granted only when all queries of this version are terminated. FIG. 6 provides a pseudocode embodiment of this version period locking logic.

Read a Record for a Query: The record key stack is examined and the first record version in the stack that is less than the query birth version number is read. That is, the first record having a TRN not in NSUL(birthversion) is fetched for reading.

Refresh the Version Period: This action increments the current version to (v+1). If the oldest active version period is (N−2) versions minus the current version (v), then the version period switching must wait until all queries of the oldest version period are terminated before beginning a new version, as will be appreciated by examining the pseudocode embodiment in FIG. 7. After switching to a new version, the pseudocode embodiment moves the oldest_v pointer to the oldest active version period, thereby allowing the record key stack to be garbage-collected. Note that the oldest_v is also moved by transactions during record update. However, it is necessary to garbage-collect here as well because not all transactions can be presumed to update the database and move the oldest_v ahead.

Referring to FIG. 7, note that an extreme example of this embodiment is to assign a very large value for N and switch the version at the end of every transaction. This would permit all queries to obtain the most recent record data. Consider also that, as N becomes larger, the number of NSUL vectors becomes larger. Also, the necessary length of the NSUL vectors increases because there must be one bit for each transaction from the oldest saved version to the present, even though no longer active. As a result, the memory consumption dedicated to NSULs will grow non-linearly as a power of two with increases in N. Also, the commit processing become more expensive because all of these transaction lists must be updated with each commit. However, the increase in resources required is not important for relatively low values of N.

This N version embodiment can be extended to a distributed database processing system with little additional invention as will be appreciated by referring to the discussion below.

Elements of the Distributed N Version Embodiment

This distributed embodiment is very similar to the non-distributed N version embodiment discussed above. The non-distributed N version embodiment is a special case of this distributed embodiment and there is no significant overhead penalty for using the more generalized distributed embodiment in the non-distributed application. All transactions and queries are assigned global version numbers. This does not, however, require that the version of all nodes within the distributed system be synchronously changed. Different nodes may have different current versions at the same time. Switching the current version is independently and atomically accomplished by each node. However, to minimize transaction delays and aborts, the current versions at the different nodes should be close. The version of a transaction is established by its originating node at precommit time. All participating nodes assign the same version to this precommit transaction. If the version of a transaction is less than the current version of any participating node, then the transaction is aborted. The originating node can assign a proper version to a transaction to minimize such aborts, perhaps by monitoring the approximate versions of the participating nodes during interactions among the nodes and assigning the maximum participating node version number (or slightly higher) to the precommitted transaction, thereby minimizing the probability of abort because of version number obsolescence.

Note that a future version number can be assigned to a transaction. This is particularly useful if the maximum participating node version number is greater than the current version of an originating node. After a future transaction commits, its locks are held until the current version period is moved ahead to catch up with it. If the locks are released earlier, transactions of current version may read the unlocked record whose value should be visible in future only. During recovery, the locks of the future committed transactions must be reacquired, as for precommitted transactions. For a general discussion of concurrency control and distributed database systems, reference is made to, for example, H. F. Korth, et al, Database System Concepts, Chapter 12, "Distributed Databases", pp. 403–448, McGraw-Hill Book Company, New York, 1986.

The birth-version of a query is established by its originating node at the query start time. All participating nodes use this birth-version to fetch the correct record version for this query. A query may arrive too early or too late at a node with respect to the current and oldest available version periods at the node. In such a case, the query is aborted. The process that establishes version period switching at the involved nodes to bring their versions closer to each other can be implemented to minimize such query aborts. The version switching process is sufficiently flexible that any reasonable communication and testing scheme for monitoring the current versions at participating nodes will suffice to coordinate node version switching.

Each node has its own set of UL and NSUL lists. It is possible for a node to commit a transaction that has started in another node and has a version number greater than the current version in the committing node. This transaction has a version in the future. The definition of UL is enhanced to include all such transactions that belong to the future and all uncommitted transactions, which may also belong to the future. Also, a new precommit list (PL) is introduced in the distributed N version embodiment. The PL contains a list of all precommitted transactions. The format and features of the PL are the same as UL and NSUL illustrated in FIG. 3.

The following summarizes the rules governing the actions taken at various stages of execution of transactions and queries in this generalized distributed embodiment of the present invention.

Start Transaction: This procedure is the same as discussed above for both the originating and the participant nodes.

Transaction Commit (Two Phase): The updating transaction commit process is a two phase process as is known in the art for distributed database systems. The first phase is a precommit phase. The transaction precommit at the originating node begins with the assignment of a version greater than or equal to the current version at the originating node. The precommit message, including the assigned version number, is then sent to the participant nodes.

The transaction commit operation at the participant node is conducted in accordance with the pseudocode embodiment illustrated in FIG. 8. The transaction first precommits at the participant node in the manner illustrated by the first pseudocode segment shown in FIG. 8. Finally, the transaction accomplishes a phase two commit at the participating node in the manner illustrated by the second segment shown in FIG. 8.

Start Query: A query is started at both the originating node and participant node in the manner illustrated by the pseudocode embodiment shown in FIG. 9. At the originating node, the birth-version of the query is assigned in the same manner as discussed above in connection with the non-distributed N version embodiment. At each participant node, the pseudocode embodiment shown in FIG. 9 is accomplished upon the first visit of the query to the participant node.

Read a Record for a Query: This is substantially the same procedure as discussed above in connection with the non-distributed embodiment except for the necessary query abort when a transaction of this version is found in the PL. The query, of course, could wait until such a precommitted transaction commits or aborts, but the preferred embodiment is configured to avoid query wait states.

Refresh The Version Period: This is essentially the same procedure as discussed above in connection with the non-distributed N version embodiment, with the additional procedures disclosed in FIG. 11 for future versions System Implications of the Methods:

The above three embodiments of the method of this invention provide a number of unexpected advantages For instance, record level locking is supported. Unlocked distributed data access is also efficiently supported. Recovery can be performed by using either shadow pages and logs or by using write-ahead logging. Queries that do not mind reading an old version of the database need not acquire any long duration locks, thereby avoiding all wait states arising from concurrent updating transactions. Queries need not update any control information (e.g. timestamps) associated with the record data items accessed.

Other advantages include the absence of a requirement for predeclaration of the set of records targeted for access by either transactions or queries. Queries are never forceably rolled back by the system, except possibly in the distributed case to avoid long delays as an option. If transactions are at all forceably rolled back, it will only be to cure deadlocks and not as a price for the system support of multiple database versions. The maximum number of versions retained by the system is tunable in accordance with any suitable user criteria. There is no need to assign timestamps to transactions or queries. The serialization order amongst conflicting transactions is determined dynamically by any suitable concurrency control mechanism known in the art. In-place updating of data on disk is possible even before the end of the transaction and there is no need for deferred update. There is also no need to force to disk all modified pages at commit time.

Further advantages include the availability of asynchronous garbage collection that can be performed in the background. Partial rollbacks (i.e. intermediate savepoints) are also supported. Incremental versioning can be performed to reduce increases in storage arising from database versioning. Log volume reduction is possible because "before images" of updated fields need not be logged except when the same record is being updated more than once by transaction. Finally, the version period concept reduces the database versioning volume that would be required by other multi-versioning systems that require new versions with each updating operation.

Obviously, other embodiments and modifications of this invention will occur readily to those of ordinary skill in the art in view of these teachings. Therefore, this invention is to be limited only by the following claims, which include all such obvious embodiments and modifications when viewed in conjunction with the above specification and accompanying drawings.

TABLE 1

| Tran Type/ Tran #/ ACTION | Primary Key or REC ID | VERSIONS (3) | (2) | (1) | UL | NSL |
|---|---|---|---|---|---|---|
| (Stable state) | 1234 | 0 | 0 | 1 | (TRN) | |
|  |  | 0 | 0 | 9 | (PTR) ( ) | ( ) |
| T/2 starts |  |  |  |  | (2) | ( ) |
| T/2 updates | 1234 | 0 | 1 | 2 | (2) | ( ) |
|  |  | 0 | 9 | 8 |  |  |
| T/2 updates | 1234 | 0 | 1 | 2 | (2) | ( ) |
|  |  | 0 | 9 | 7 |  |  |
| Q/1 starts | ... |  |  |  | (2) | ( ) |
| Q/1 reads | 1234 | TRN(2) version (Pointed to by 9) | | | | |
| T/2 commits | ... |  |  |  | ( ) | (2) |
| Q/1 ends | ... |  |  |  |  |  |
| Refresh versions | 1234 | 0 | 1 | 2 |  |  |
|  |  | 0 | 9 | 7 | ( ) | ( ) |
| T/3 starts | ... |  |  |  | (3) | ( ) |
| T/3 updates | 1234 | 0 | 2 | 3 | (3) | ( ) |
|  |  | 0 | 7 | 6 |  |  |
| T/3 commits | ... |  |  |  | ( ) | (3) |
| T/4 starts | ... |  |  |  | (4) | (3) |
| T/4 updates | 1234 | 2 | 3 | 4 | (4) | (3) |
|  |  | 7 | 6 | 5 |  |  |
| Q/2 starts |  |  |  |  |  |  |
| Q/2 reads | 1234 | TRN(3) version (Pointed to by 7) | | | | |
| Q/2 ends |  |  |  |  |  |  |
| Refresh versions | ... |  |  |  | (4) | ( ) |
| Q/3 starts |  |  |  |  |  |  |
| Q/3 reads | 1234 | TRN(2) version (Pointed to by 6) | | | | |
| Q/3 ends |  |  |  |  |  |  |
| T/4 ends | ... |  |  |  | ( ) | (4) |
| T/5 starts | ... |  |  |  | (5) | (4) |
| T/5 updates | 1234 | 3 | 4 | 5 | (5) | (4) |
|  |  | 6 | 5 | 4 |  |  |
| T/5 aborts | 1234 | 0 | 3 | 4 | ( ) | (4) |
|  |  | 0 | 6 | 5 |  |  |
| T/6 starts | ... |  |  |  | (6) | (4) |
| T/6 deletes | 1234 | 3 | 4 | 6 | (6) | (4) |
|  |  | 6 | 5 | 0 |  |  |
| etc. |  |  |  |  |  |  |

TABLE 2

| Secondary Key Substructure | | | | | | |
|---|---|---|---|---|---|---|
| 9/1234 | (3) | (2) | (1) |  |  |  |
|  | 0 | 0 | 1 | TRN |  |  |
|  | 0 | 0 | 1 | Flag - Information about key's existence | | |
| ACTION | REC ID | VERSIONS | | | UL | NSL |
| Stable state | 9/1234 |  |  |  |  |  |
|  |  | (3) | (2) | (1) |  |  |
|  |  | 0 | 0 | 1 |  |  |
|  |  | 0 | 0 | 1 | ( ) | ( ) |
| T/2 starts |  |  |  |  | (2) | ( ) |
| T/2 updates | 9/1234 | 0 | 1 | 2 | (2) | ( ) |
|  |  | 0 | 1 | 0 | secondary key changes from 9 to 8 | |
|  | 8/1234 | 0 | 0 | 2 |  |  |
|  |  | 0 | 0 | 1 |  |  |
| etc. |  |  |  |  |  |  |

We claim:

1. In a computer-implemented concurrent transaction and readonly query processing system in which a plurality N of versions of a database are maintained during a present version period (v), said database including a plurality of data records that are updated by said transactions and read by said queries, a plurality of versions of each of said plurality of data records being distributed among said database versions, each said database version (i) consisting essentially of said data records existing at the beginning of the corresponding said version period (i), each said version period (i) being the time interval between one said database version (i) and the next subsequent said database version (i+1), said database versions including a present database version (v), a present stable database version (v−1) and an oldest database version (v-N+1), wherein N is a positive integer greater than 2, a method for concurrency control comprising the unordered steps of:
  (a) maintaining a dynamic Uncommitted List (UL) of all said transactions that are uncommitted;
  (b) maintaining for said present database version (v) a present version (v) of a Non-Stable and Uncommitted List (NSUL) of all said transactions that are either uncommitted or were committed no earlier than during said present version period(v);
  directing all said read-only queries that arrive during said present version period (v) to said data records in said present stable database version (v−1); and
  (d) refreshing said present database version (v) by performing the steps of
    (d.1) setting a refresh time t after all said read-only queries that arrived during said oldest version period (v−N+2) are terminated,
    (d.2) creating a new version (v+1) of said database containing said data records existing at said refresh time t,
    (d.3) creating a new version (v+1) of said NSUL containing said transactions listed at said refresh time t in said dynamic UL, and
    (d.4) initiating a new version period (v+1) at said refresh time t by assigning said present database version (v) to be the new present stable database version (v), whereby database atomicity is maintained buy using said present stable database version (v) for subsequent read-only query processing without lock conflict or transaction rollback.

2. The method of claim 1 wherein said refreshing step (d) is performed before the updating of a data record written by a previous committed transaction listed in said NSUL.

3. The method of claim 1 wherein said setting step (d.1) further comprises the step of:
  (d.1.1) aborting all said read-only queries that had arrived during said oldest version period (v−N+2).

4. The method of claim 2 wherein said processing system includes record accession means for accessing said database records, said record accession means having at least one record key structure corresponding to each said record, said structure having a plurality of substructures each corresponding to one of said N+1 record versions, further comprising the unordered step of:
  (e) updating said record key structure corresponding to said updated record.

5. The method of claim 2 wherein:
  said UL and NSULs comprise bit maps having at least one bit position corresponding to each said transaction that is still, active or was terminated after the start of said version period (v−N+2).

6. The method of claim 1 wherein said processing system includes record accession means for accessing said database records, said record accession means having at least ne record key structure corresponding to each said record, said structure having a plurality of substructures each corresponding to one of said N+1 record versions, further comprising the step of:
  (e) updating said record key structure corresponding to said updated record.

7. The method of claim 1 wherein:
  said UL and said NSULs comprise bit maps having at least one bit position corresponding to each said transaction that is still active or was terminated after the start of said oldest version period (v−N+2).

8. In a computer-implemented concurrent transaction and read-only query processing system in which at least two versions of a database are maintained during a present version period, said database including a plurality of data records that are updated by said transactions and read by said queries, at least two versions of each data record of said plurality of data records being distributed among said database versions, each said database version(i) consisting essentially of said data records existing at the beginning of a corresponding said version period (i), each said version period (i) being the time interval between one said database version (i) and the next subsequent said database version (i+1), said versions including a present version and a stable version, a method for concurrency control comprising the underordered steps of:
  (a) maintaining a dynamic Uncommitted List (UL) of all said transactions that are uncommitted;
  (b) maintaining a Non-Stable and Uncommitted List (NSUL) of all said transactions that are either uncommitted or were committed during said present version period;
  (c) directing all said read-only queries that arrive during said present version period to said data records in said stable database version; and
  (d) refreshing said present database version by performing the steps of
    (d.1) setting a refresh time t after all said read-only queries are terminated,
    (d.2) creating a new version of said database containing said data records existing at said refresh time t,
    (d.3) resetting said NSUL to equal said UL, and
    (d.4) initiating a new version period at said refresh time t by assigning said present database version to be the new stable database version, whereby database atomicity is maintained by using said stable database version for read-only query processing without lock conflict or transaction rollback.

9. The method of claim 8 wherein said refreshing step (d) is performed before updating a record written by a committed transaction listed in said NSUL.

10. The method of claim 8, wherein said setting step (d.1) comprises the step of:
  (d.1.1) aborting all said read-only queries that had arrived during the oldest said version period for which a corresponding database version is maintained.

11. The method of claim 8 wherein:
  said UL and said NSUL comprise bit maps having at least one bit position corresponding to each said transaction that is still active or was terminated after said start of the stable version period.

12. The method of claim 8 wherein said processing system includes record accession means for accessing said database records, said record accession means having at least one record key structure corresponding to each said record, said structure having a plurality of substructures each corresponding to one of said record versions, further comprising the unordered step of:

(e) updating said record key structure corresponding to said updated record.

13. In a distributed computer-implemented concurrent transaction and query processing system having a plurality of nodes in each of which are maintained portions of up to N versions of a distributed database, said distributed database including a plurality of data records distributed among said nodes, each data record of said plurality of data records being updated by said transactions and read by said queries, a plurality of versions of each said data record being distributed among said database versions, each said database version (i) at each node consisting essentially of the version (i) of said data records existing at said each node at the beginning of a corresponding said version period (i) for each said node, each said version period (i) for said each node being the time interval between one said database version (i) and the next subsequent said database version (i+1) for said each node, said database versions including a present database version (v), a present stable database version (v−1) and an oldest database version (v−N+2), said nodes having both original and received transactions and queries, wherein N is a positive integer greater than 2, a method for concurrency control comprising the unordered steps of:

(a) maintaining within each said node a dynamic Uncommitted List (UL) of all said transactions that are uncommitted within said each node;

(b) maintaining for said present version period (v) within each said node a present version (v) of a Non-Stable and Uncommitted List (NSUL) of all said transactions that are either uncommitted or were committed within said each node no earlier than during said present version period (v) for said each node;

(c) maintaining within each node a dynamic Precommit List (PL) of all precommitted transactions involving said each node;

(d) directing within each node all said queries that originate during said present version period (v) of the query originating node to said data records of said present stable database version (v−1) within said each node;

(e) refreshing said present database version (v) by performing within each node the steps of (e.1) setting a refresh time t after all said read-only queries that arrived at said each node during said oldest version period (v−N+2 are terminated, (e.2) creating a new version (v+1) of said NSUL containing said transactions listed at said refresh time t in said dynamic UL within said each node, and (e.3) initiating a new version period (v+1) within said each node at said refresh time t by assigning said present database version (v) to be the new present stable database version (v) and creating a new present database version v+1);

(f) aborting, within said each node, every said transaction having an originating node version period earlier than said present version period (v) in said each; and (g) aborting within said each node all said read-only queries directed to a database version represented in said dynamic PL for said each node.

14. The method of claim 13 wherein said refreshing step (e) is performed before the updating within said each node of a data record written by a committed transaction listed in said NSUL for said each node.

15. The method of claim 14 wherein said setting step (e.1) comprises the step of:

(e.1.1) aborting within said each node all said read-only queries that had arrived during said oldest version period (v−N+2) within said each node.

16. The method of claim 13 wherein:

said UL, said PL and said NSULs are implemented as bit maps having a single bit position corresponding to each said transaction that is still active or was terminated after the start of said oldest version period (v−N+2).

17. The method of claim 13 wherein said processing system includes record accession means in each said node for accessing said database records, said record accession means having at least one record key structure corresponding to each said record in said each node, said structure having a plurality of substructures each corresponding to one of said N+1 record versions, further comprising the unordered step of:

(g) updating said key structure corresponding to said each updated record within said each node.

18. A computer-implemented concurrent transaction and query processing system comprising:

multi-version database means for storing up to N versions of a database during a present version period (v), said database including a plurality of data records that are updated by said transactions and read by said queries, a plurality of versions of each data record of said plurality of data records being distributed among said database versions, each said database version (i) consisting essentially of said data records existing at the beginning of a corresponding said version period (i), each said version period (i) being the time interval between one said database version (i) and the next subsequent said database version (i+1), said database versions including a present database version (v) and a present stable database version (v−1);

Uncommitted List (UL) means coupled to said multi-version database means for identifying all uncommitted transactions;

Non-Stable and Uncommitted List (NSUL) means coupled to said multi-version database means for identifying all said transactions that are either uncommitted or were committed no earlier than during said present version period (v);

record accession means coupled to said multi-version database means for locating each said data record version and for identifying the transaction that created said each data record version;

version initiation means coupled to said multi-version database means for starting a new version period by assigning said present database version (v) to be the new present stable database version (v); and garbage collection means for eliminating superfluous database records in response to an update by a transaction to a data record written by a previous committed transaction listed in said NSUL.

19. A computer-implemented concurrent transaction and query processing system comprising:

multi-version database means for storing two versions of a database, said database including a plurality of data records that are updated by said transactions and ready by said queries, up to two versions of each data record of said plurality of data records being distributed among said two database versions, each said database version (i) consisting essentially of said data records existing at the beginning of a corresponding said version period (i), each said version period (i) being the time interval between one said database version (i) and the next subsequent said database version (i+1), said data record versions including a present data record version and a present stable data record version;

Uncommitted List (UL) means coupled to said multi-version database means for identifying all uncommitted transactions;

Non-Stable and Uncommitted List (NSUL) means coupled to said multi-version database means for identifying all said transactions that are either uncommitted or were committed during said present version period;

record accession means coupled to said multi-version database means for locating each said record version and for identifying the transaction that created said each record version;

version initiation means coupled to said multi-version database means for starting a new version period by assigning said present data record version to be the new present stable data record version; and garbage collection means for eliminating superfluous database records in response to an update by a transaction to a data record written by a previous committed transaction listed in said NSUL.

* * * * *

UNITED STATES PATENT AND TRADEMARK OFFICE
CERTIFICATE OF CORRECTION

PATENT NO. : 5,280,612
DATED : January 18, 1994
INVENTOR(S) : Lorie et al

It is certified that error appears in the above-indentified patent and that said Letters Patent is hereby corrected as shown below:

Claim 1, Col 19, Line 16, please insert --(c)-- before "directing";
Line 34, please replace "buy" with --by--.

Claim 6, Col. 19, Line 65, please replace "ne" with --one--.

Claim 8, Col. 20, Lines 23-24, please replace "underordered" with --unordered--;
Line 40, please replace "." with --,--.

Claim 13, Col. 21, Line 50, please insert missing --)-- after "N+2";
Line 59, please insert missing --(-- before "v+1"

Signed and Sealed this

Thirty-first Day of May, 1994

*Attest:*

BRUCE LEHMAN

*Attesting Officer*     *Commissioner of Patents and Trademarks*